United States Patent
Solland

(10) Patent No.: US 9,665,127 B2
(45) Date of Patent: May 30, 2017

(54) ELECTRONIC DEVICE AND CONNECTING PART

(71) Applicants: BEIJING LENOVO SOFTWARE LTD., Beijing (CN); LENOVO (BEIJING) LIMITED, Beijing (CN)

(72) Inventor: Kurt Solland, Beijing (CN)

(73) Assignees: BEIJING LENOVO SOFTWARE, Beijing (CN); LENOVO (BEIJING) LIMITED, Beijing (CN)

( * ) Notice: Subject to any disclaimer, the term of this patent is extended or adjusted under 35 U.S.C. 154(b) by 235 days.

(21) Appl. No.: 14/500,637

(22) Filed: Sep. 29, 2014

(65) Prior Publication Data

US 2015/0138712 A1 May 21, 2015

(30) Foreign Application Priority Data

Nov. 20, 2013 (CN) .......................... 2013 1 0590968
Feb. 19, 2014 (CN) .......................... 2014 1 0056814

(51) Int. Cl.
*G06F 1/16* (2006.01)

(52) U.S. Cl.
CPC .......... *G06F 1/1652* (2013.01); *G06F 1/1626* (2013.01); *G06F 1/1632* (2013.01); *G06F 1/1654* (2013.01); *G06F 1/1681* (2013.01)

(58) Field of Classification Search
CPC .... G06F 1/1632; G06F 1/1633; G06F 1/1637; G06F 1/1652
See application file for complete search history.

(56) References Cited

U.S. PATENT DOCUMENTS

| | | | | |
|---|---|---|---|---|
| 6,243,074 B1* | 6/2001 | Fishkin | ..................... | G06F 1/16 345/156 |
| 8,005,521 B2* | 8/2011 | Cho | ..................... | H04M 1/0216 379/433.13 |
| 8,125,759 B2* | 2/2012 | Fukuma | .................. | F16G 13/18 248/349.1 |
| 8,319,725 B2* | 11/2012 | Okamoto | .......... | G02F 1/133305 345/107 |
| 8,427,420 B2* | 4/2013 | Yamazaki | ............. | G06F 1/1616 345/100 |
| 8,755,181 B2* | 6/2014 | Okutsu | ................. | G06F 1/1616 361/679.55 |
| 8,813,312 B2* | 8/2014 | Song | ..................... | G06F 1/1601 16/225 |
| 8,971,032 B2* | 3/2015 | Griffin | .................. | G06F 1/1616 345/156 |
| 9,047,055 B2* | 6/2015 | Song | ......................... | E05D 3/14 |
| 9,064,431 B2* | 6/2015 | Ahn | ......................... | G09F 9/33 |
| 9,167,711 B2* | 10/2015 | Lee | | |
| 9,218,025 B2* | 12/2015 | Bates | .................... | G06F 1/1662 |
| 2006/0198513 A1* | 9/2006 | Eldon | ................... | G06F 1/1616 379/433.13 |

(Continued)

Primary Examiner — Anthony Q Edwards

(57) ABSTRACT

The present application discloses an electronic device and a connecting part. The electronic device includes a first body and a second body, wherein the first body has at least a display screen arranged thereon; and the second body is connected to a first end face of the first body; wherein only the first end face of the first body is arranged with the second body, and the second body is deformable. The present application further discloses a connecting part and an electronic device including the connecting part.

17 Claims, 8 Drawing Sheets

(56) References Cited

U.S. PATENT DOCUMENTS

| | | | | |
|---|---|---|---|---|
| 2010/0171683 A1* | 7/2010 | Huitema | G02F 1/13452 | 345/55 |
| 2010/0245209 A1* | 9/2010 | Miller | G06F 1/1618 | 345/1.3 |
| 2010/0295761 A1* | 11/2010 | van Lieshout | G06F 1/1601 | 345/84 |
| 2011/0188189 A1* | 8/2011 | Park | G05B 11/01 | 361/679.05 |
| 2012/0194448 A1* | 8/2012 | Rothkopf | A45C 13/002 | 345/173 |
| 2012/0307423 A1* | 12/2012 | Bohn | G06F 1/1641 | 361/679.01 |
| 2013/0265257 A1* | 10/2013 | Jung | G06F 3/0412 | 345/173 |
| 2013/0271373 A1* | 10/2013 | Milhe | G06F 1/1671 | 345/168 |
| 2013/0279100 A1* | 10/2013 | Fontana | G06F 1/1632 | 361/679.2 |
| 2014/0004906 A1* | 1/2014 | Chi | H04B 1/38 | 455/566 |
| 2014/0015743 A1* | 1/2014 | Seo | G06F 3/0488 | 345/156 |
| 2014/0028596 A1* | 1/2014 | Seo | G06F 3/0487 | 345/173 |
| 2014/0043121 A1* | 2/2014 | Sartee | G06F 1/16 | 335/219 |
| 2014/0174226 A1* | 6/2014 | Hsu | E05D 3/122 | 74/98 |
| 2014/0204509 A1* | 7/2014 | Park | G02F 1/133305 | 361/679.01 |
| 2015/0009613 A1* | 1/2015 | Morita | G06F 1/1626 | 361/679.26 |
| 2015/0023030 A1* | 1/2015 | Tsukamoto | G06F 1/1652 | 362/419 |
| 2015/0085444 A1* | 3/2015 | Ke | G06F 1/1632 | 361/679.56 |
| 2015/0131222 A1* | 5/2015 | Kauhaniemi | G06F 1/1652 | 361/679.27 |
| 2015/0138698 A1* | 5/2015 | Solland | F16B 2/22 | 361/679.01 |
| 2015/0141074 A1* | 5/2015 | Shim | H04M 1/0216 | 455/556.1 |
| 2015/0286253 A1* | 10/2015 | Jung | G06F 1/1652 | 361/679.3 |
| 2015/0362956 A1* | 12/2015 | Tazbaz | G06F 1/1637 | 361/679.27 |
| 2015/0381929 A1* | 12/2015 | Lee | H04M 1/0202 | 348/14.03 |
| 2016/0026221 A1* | 1/2016 | Lee | G06F 1/1654 | 361/679.29 |
| 2016/0139399 A1* | 5/2016 | O'Connell | G02B 25/002 | 359/801 |

* cited by examiner

ELECTRONIC DEVICE AND CONNECTING PART

CROSS REFERENCE TO RELATED APPLICATIONS

This application claims priority from Chinese National Application Nos. 201310590968.X filed on Nov. 20, 2013, and 201410056814.7 filed on Feb. 19, 2014, the contents of which are incorporated herein by reference.

BACKGROUND

Technical Field

The present disclosure relates to the field of electronic technology, and in particular, to electronic devices and connecting parts.

Related Art

With the progress of society and the development of science and technology, electronic devices such as notebooks, tablets etc. have become an indispensable part of people's lives.

An existing notebook includes a first body, a second body and a connecting member connecting the first body and the second body. Rotation of the second body with respect to the first body is achieved through the connecting member, so that the second body can be at different usage angles with respect to the first body, for convenience of use by users of different heights.

An existing tablet is a plate, which has a display screen arranged thereon and an electronic device arranged therein. When the tablet is in use, a user may hold up the tablet with one hand and performs operations with the other hand. However, the inventor of the present application discovers that at least the following technical problems exist in the above existing technology in the process of implementing the technical solutions of the present application: usage forms of the existing electronic devices such as notebooks, tablets etc. are unitary, which can not meet users' diversified usage requirements.

In addition, in order to meet people's various requirements, forms of the electronic devices are increasingly diverse. An existing electronic device generally includes a main body having a display function, a holding part, and a flexible portion connecting the holding part and the main body. When in use, the main body, the holding part and the flexible portion may be located in the same plane; or a force may be applied so that the flexible portion deforms and the holding part can rotate with respect to the main body.

However, the inventor of the present application at least discovers that the following technical problems exist in the above existing technology in the process of implementing the technical solutions of the present application: when a video is played using the above electronic device, it needs to hold the electronic device in hand, limiting the activity of the user's hands.

SUMMARY

In a first aspect, embodiments of the present disclosure provide an electronic accessory, comprising: an integrated body having a flat structure in a normal state and having a bent structure in a deformed state, the integrated body further comprising: a first part having at least a display screen; a second part being deformable; and a third part connected to the first part via the second part.

In a second aspect, the embodiments of the present disclosure provide an electronic device, comprising: an electronic accessory comprising an integrated body having a flat structure in a normal state and having a bent structure in a deformation state; and a holding element configured to hold the electronic accessory, the holding element comprising an accommodating groove configured to receive at least a part of the accessory to hold the accessory.

In a third aspect, the embodiments of the present disclosure provide an electronic device, comprising: a main body; an electronic accessory comprising an integrated body having a flat structure in a normal state and having a bent structure in a deformation state; and a holding element arranged on a first side of the main body, the holding element comprising an accommodating groove configured to receive at least a part of the electronic accessory to hold the electronic accessory on the main body.

BRIEF DESCRIPTION OF THE DRAWINGS

In order to illustrate technical solutions in the embodiments of the present disclosure or the related art more clearly, accompanying drawings needed to be used in the description of the embodiments will be described below in brief. Obviously, the accompanying drawings described below are merely some embodiments of the present application.

DETAILED DESCRIPTION OF THE EMBODIMENTS

Please note that the term "an electronic accessory" used herein may refer to an electronic device (such as, a laptop, a tablet, a mobile phone, or the like) and/or any part of an electronic device (such as, a display screen, a physical keyboard/keypad, or the like). Hereinafter, the terms "accessory" and "device" may be used interchangeably unless otherwise indicated.

The general concept of the technical solutions according to the embodiments of the present application is described below.

An electronic device includes a first body and a second body, wherein the first body has at least a display screen arranged thereon; and the second body is connected to a first end face of the first body; wherein only the first end face of the first body is arranged with the second body, and the second body is deformable.

The second body of the electronic device is configured to be deformable. Thereby, when the electronic device is in use, the second body can be deformed into different shapes, to bring the electronic device to be in different usage states. This solves the technical problem in the related art that the usage forms of the electronic devices are unitary, which can not meet users' diversified usage requirements, and achieve the purpose of meeting users' diversified usage requirements.

For better understanding the above technical solutions, the above technical solutions will be described in detail below in injunction with accompanying drawings of the specification and specific embodiments.

Figure 1:
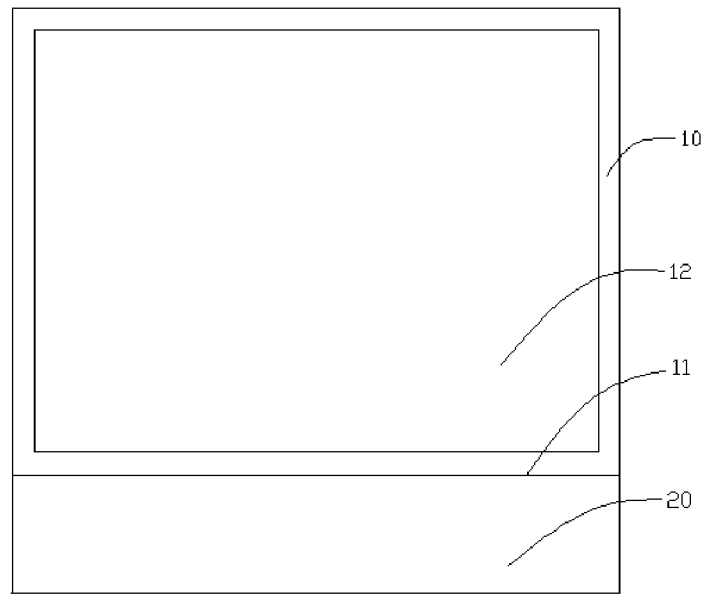
FIG. 1 is a structural schematic diagram of an electronic device according to an embodiment of the present application.

As shown in FIG. 1, illustrated is a structural schematic diagram of an electronic device 100 according to a first embodiment of the present application. The electronic device 100 may be a PAD, a notebook, a watch etc. The electronic device 100 includes a first body 10 and a second body 20.

The first body 10 has at least a display screen 12 arranged thereon to display information to be viewed by a user.

The second body 20 is connected to a first end face 11 of the first body 10. The second body 20 is connected to the first end face 11 of the first body to prevent a groove from being formed on the first body 10, thereby not influencing the appearance of the first body 10.

Only the first end face 11 on the first body 10 is arranged with the second body 20, and the second body 20 is deformable as a whole. Specifically, the second body 20 may be made of a deformable material or may be a deformable member.

The second body 20 of the electronic device 100 is configured to be deformable. Thereby, when the electronic device 100 is in use, the second body may be deformed into different shapes. The deformed second body 20 may be fixed by applying a force to the second body 20 or setting other fixed members. In this way, the electronic device 100 may be in different usage states. This solves the technical problem in the related art that the usage forms of the electronic devices are unitary, which can not meet users' diversified usage requirements, and achieve the purpose of meeting users' diversified usage requirements.

Further, after the second body 20 is deformed, the second body 20 can maintain in a deformed state. Specifically, in order to enable the second body 20 to maintain in the deformed state, when the second body 20 is a deformable member, the electronic device 100 may maintain in the deformed state through a friction between deformable members; when the second body 20 is made of a deformable material, the electronic device 100 may maintain in the deformable state by adding a steel plate etc.; or the second body 20 may maintain in the deformable state by directly adding a fixed structure, for example members such as a fixed band, a fixed groove and a fixed block etc. The second body 20 is arranged to maintain in the deformed state, so that when the electronic device is in use by a user, occurrence of conditions such as elastic recovery of the second body 20 due to improper use is avoided, for convenience of use by the user.

Further, the electronic device 100 may maintain in a state of a position of the first body 10 with respect to the deformed second body 20. Specifically, this can be achieved through a friction between the first body 10 and the second body 20. For example, when the second body 20 is a deformable member, the electronic device 100 may maintain in a state of an unchanged position of the first body 10 with respect to the deformed second body 20 through frictions between various members and frictions between the members and the first body 10. In addition, this may also be achieved by separately arranging other fixed members such as a fixed band, a fixed block and a fixed groove etc. The electronic device 100 is arranged to maintain in a state of the unchanged position of the first body 10 with respect to the deformed second body 20. In this way, when the electronic device 100 is in use by a user, the position of the second body 20 with respect to the first body 10 maintains unchanged. This solves the technical problem in the related art that a protective cover of an electronic device, such as, an IPAD, etc. may rotate freely with respect to a body, thereby improving users' usage satisfaction.

Further, in a specific implementation, the electronic device 100 may maintain in a state of any position of the first body 10 with respect to the deformed second body 20. That is, no matter where the second body 20 is located after the second body 20 deforms with respect to the first body 10, the position of the first body 10 may maintain unchanged with respect to the second body 20. In this way, the electronic device 100 can be in multiple stable states, and a user may use the electronic device 100 in any of the multiple stable states of the electronic device 100, thereby improving user experience.

Figure 2:
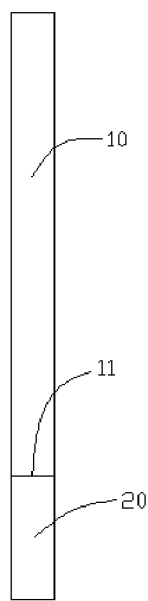
FIG. 2 is a side view of a first usage posture of the electronic device in FIG. 1.
Figure 3:
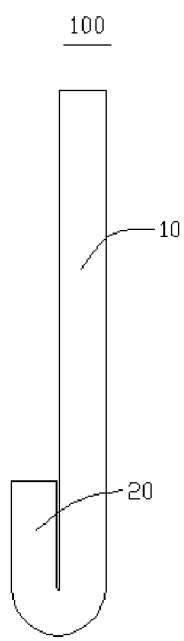
FIG. 3 is a side view of a second usage posture of the electronic device in FIG. 1.
Figure 4:
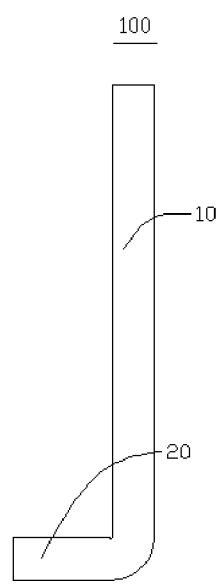
FIGS. 4 and 5 are side views of a third usage posture of the electronic device in FIG. 1.
Figure 5:
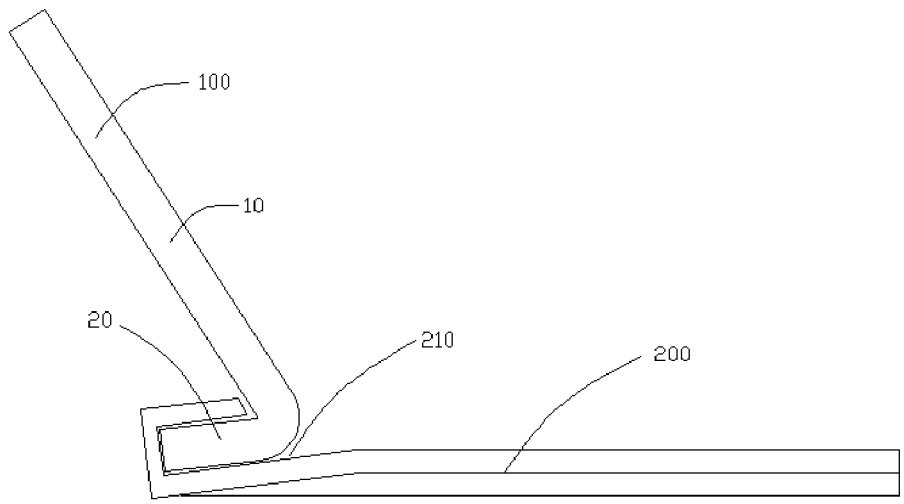

Specifically, the electronic device 100 may be in three different usage postures:

As shown in FIG. 2, when the first body 10 is located at a first position and is stationary with respect to the deformed second body 20, the first position of the first body 10 with respect to the deformed second body 20 maintains unchanged, and the electronic device 100 is in a first usage posture; and/or As shown in FIG. 3, when the first body 10 is located at a second position and is stationary with respect to the deformed second body 20, the second position of the first body 10 with respect to the deformed second body 20 maintains unchanged, and the electronic device 100 is in a second usage posture different from the first usage posture; and/or As shown in FIGS. 4 and 5, when the first body 10 is located at a third position and is stationary with respect to the deformed second body 20, the third position of the first body 10 with respect to the deformed second body 20 maintains unchanged, and the electronic device 100 is in a third usage posture. The first usage posture, the second usage posture and the third usage posture are different from each other.

In the present implementation, the first usage state is a plate state, i.e., the first body 10 and the second body 20 are located in the same plane. At this time, the electronic device 100 may be used as a tablet.

The second usage state is a holding state, i.e., the second body 20 may deform under an external force to be folded up or rolled up with respect to the first body 10, so that a user can hold the electronic device 100 with one hand and operate the electronic device 100 with the other hand, for convenience of use by the user when in a walk or in a car etc. The second body 20 is folded up or rolled up to be held by a user, thereby reducing possibility that the electronic device 100 drops when is in use. Specifically, in order to enable the electronic device 100 to be in a holding state, the second body 20 is rolled up into a roll, to change the electronic device 100 into a holding usage state.

The third usage state is a supporting state, i.e., the second body 20 rotates with a certain angle with respect to the first body 10. The second body 20 can support the electronic device 100 on a support such as a desktop etc., or the second body 20 is fixed to a base or an extended dock and enables the display screen 12 of the first body 10 to be at a visible angle for the user.

When the second body 20 is fixed in a fixed groove 210 of a fixed body 200 such as a base or an extended dock etc., when a magnetic member 21 is arranged on an end face of the second body 20 away from the first body 10 and the second body 20 is inserted into the fixed groove 210, the magnetic member 21 is attracted to a magnetic member arranged in the fixed groove 210 corresponding to the magnetic member 21. In this way, the electronic device 100 is accurately fixed to the fixed body 200, thereby preventing the second body 20 from being separated from the fixed body 200 under an improper force.

Specifically, the electronic device 100 has multiple usage postures, for example, a first usage posture, a second usage posture, a third usage posture etc. When the usage posture of the electronic device 100 changes, at least display contents corresponding to a current usage posture of the electronic device 100 are displayed on the display screen 12. For example, assuming that a state of the electronic device 100 changes from a plate state to a holding usage state, at least corresponding display contents for example in an e-book mode when the electronic device 100 is in a holding usage state are displayed on the display screen 12.

In a specific embodiment, a size of the second body 20 may be set as needed. There are three manners to design the size of the second body 20 as follows.

In a first manner, as shown in FIG. 1, a distance between a first end on the first body 10 connected to the second body 20 and a second end opposite to the first end is greater than a distance between a third end on the second body 20 connected to the first body 10 and a fourth end opposite to the third end. That is, a width of the second body 20 is generally less than that of the first body 10. In some embodiments, the electronic device 100 may be a PAD, an e-book etc.

Figure 6:
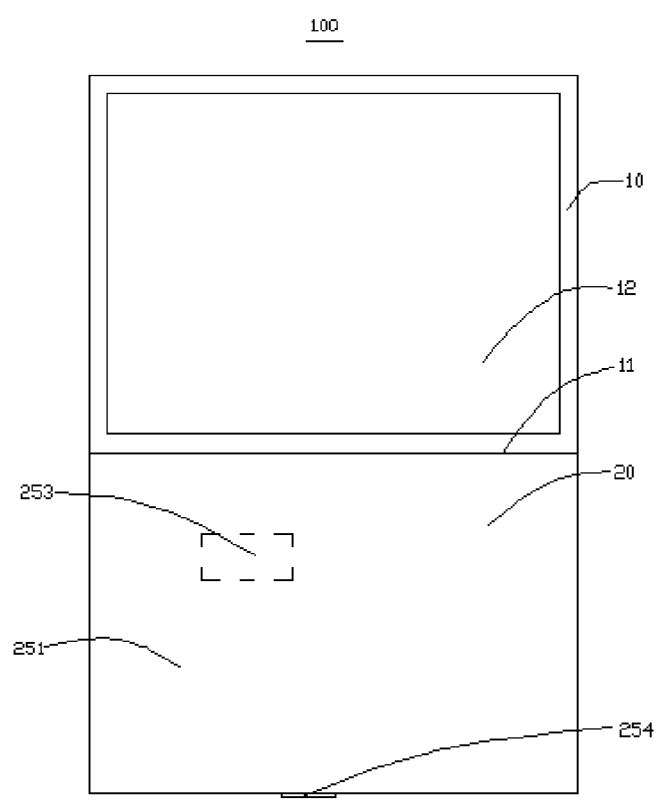
FIG. 6 is a structural schematic diagram of an electronic device according to a second embodiment of the present application.
Figure 7:
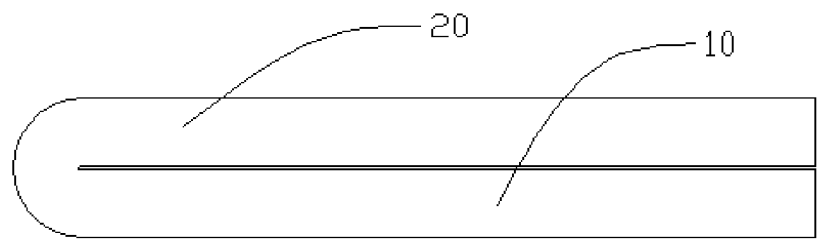
FIG. 7 is a side view of another state of the electronic device in FIG. 6.

In a second manner, as shown in FIGS. 6 and 7, the distance between the first end on the first body 10 connected to the second body 20 and the second end opposite to the first end is approximately equal to the distance between the third end on the second body 20 connected to the first body 10 and the fourth end opposite to the third end. The second body 20 can generally cover the first body 10. "Approximately" means that the size of the second body 20 only needs to be able to basically cover the first body 10. The second body 20 is arranged to cover the first body 10 to protect the display screen 12 of the first body 10. Specifically, an electronic element may or may not be arranged in the second body 20. In some embodiments, the electronic device 100 may be a notebook, a PAD with a protective plate etc.

Figure 8:
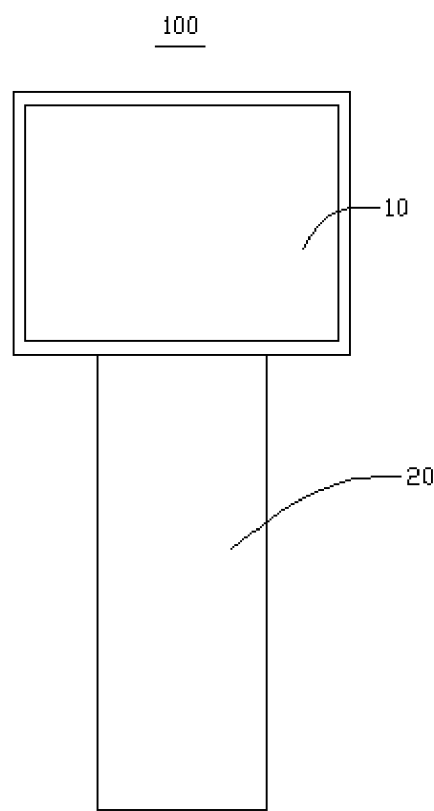
FIG. 8 is a structural schematic diagram of an electronic device according to a third embodiment of the present application.

In a third manner, as shown in FIG. 8, the distance between the first end on the first body 10 connected to the second body 20 and the second end opposite to the first end is less than the distance between the third end on the second body 20 connected to the first body 10 and the fourth end opposite to the third end. The second body 20 is generally used to fix the first body 10 to a fixed body. That is, a width of the second body 20 is greater than that of the first body 10, so as to fix the first body 10 to the fixed body, or may also cover the first body 10. At this time, the electronic device 100 may be a watch etc.

In a specific embodiment, the second body 20 may have the following three structures as described in detail below.

Figure 9:
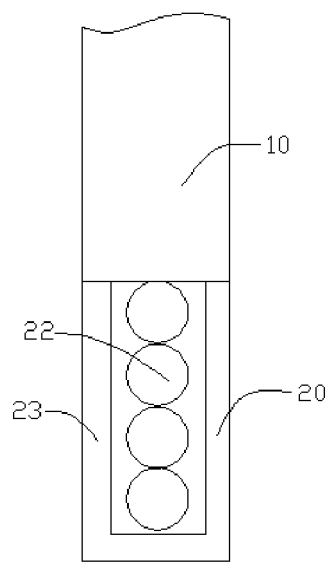
FIG. 9 is a structural schematic diagram of an electronic device according to a fourth embodiment of the present application.

In a first structure, as shown in FIG. 9, the second body 20 includes a rotating shaft 22, which is rotationally connected to the first end face 11 of the first body 10. Different states of the position of the first body 10 with respect to the second body 20 may be maintained through the rotating shaft 22.

In addition, the second body 20 may be implemented in the following manner to achieve a beautiful appearance of the electronic device 100. Specifically, the second body 20 further includes an elastic housing 23 made of an elastic material. The rotating shaft 22 is coated with the elastic housing 23 and is fixedly connected to the first end face 11. When the position of the first body 10 with respect to the second body 20 changes, the elastic housing 23 elastically deforms. When the position of the first body 10 with respect to the second body 20 changes, the elastic housing 23 elastically deforms, so as to ensure that the end face of the second body 20 away from the first body 10 will not change accordingly. That is, the position relationship of the end face of the second body 20 away from the first body 10 with respect to other surfaces connected to the end face maintains unchanged, thereby improving quality of appearance of the electronic device 100.

Figure 10:
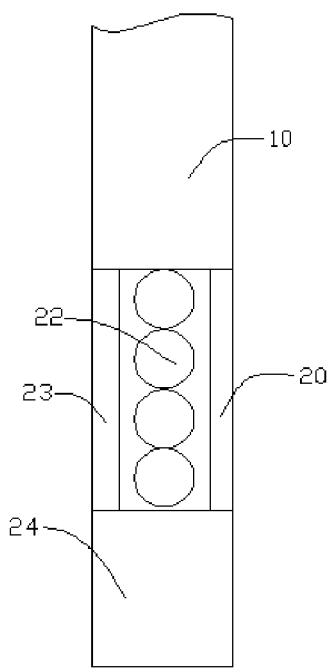
FIG. 10 is a structural schematic diagram of an electronic device according to a fifth embodiment of the present application.

In a second structure, as shown in FIG. 10, the second body 20 includes a rotating shaft 22 and an extended portion 24.

The rotating shaft 22 is rotationally connected to the first end face 11 of the first body 10. Different states of the position of the first body 10 with respect to the second body 20 may be maintained through the rotating shaft 22.

The extended portion 24 is connected to an end on the rotating shaft 22 away from the first body 10. A size of the extended portion 24 in a connecting direction of the first body 10, the rotating shaft 22 and the extended portion 24 is less than a size of the rotating shaft 22 in the connecting direction. The extended portion 24 may be made of an elastic material or a rigid material.

The extended portion 24 may be used to fix the electronic device 100 to the fixed body 200. Specifically, when the extended portion 24 is fixed to the fixed body 200, the position relationship of the first body 10 with respect to the second body 20 may be changed with a single hand. Specifically, the extended portion 24 may be fixed in the fixed groove 210 of the fixed body 200 such as a base, an extended dock etc. When the extended portion 24 is fixed in the fixed groove 210, an additional weight is added to the fixed body 200, so that a moment generated by the gravities of the fixed body 200 and the extended portion 24 is greater than a moment generated by a gravity of the first body 10 and a force applied on the first body 10. In this way, when the electronic device 100 is to be opened, a force needs to be applied on the first body only with one hand without operating the second body 20 or the fixed body 200 with the other hand. This can ensure that the electronic device 100 will not fall over or roll over.

In addition, when the electronic device 100 only includes a rotating shaft 22 but not an extended portion 24 and the electronic device 100 needs to be fixed to the fixed body 200, a part of the rotating shaft 22 may be fixed to the fixed part 200. That is, when the electronic device 100 needs to be fixed to the fixed body 200, a part of the second body 20 is fixed to the fixed body 200, so that the position relationship of the first body 10 with respect to the second body 20 can be changed with a single hand.

In a third structure, also with reference to FIG. 5, the second body 20 includes a rotating shaft 22 and a functional main body 25.

The rotating shaft 22 is rotationally connected to the first end face 11 of the first body 10. Different states of the position of the first body 10 with respect to the second body 20 can be maintained through the rotating shaft 22.

The functional main body 25 is connected to an end on the rotating shaft 22 away from the first body 10. The functional main body 25 includes a housing 251 and an electronic element 253 arranged in the housing 251. That is, the second body 20 is a host.

When the second body 20 is a host, an interface 254 connected to the electronic element 253 is arranged on an end face of the second body 20 away from the first body 10. The electronic device 100 performs electrical signal transmission through the interface 254. For example, when the electronic device 100 is inserted into an extended dock, the interface 254 may be inserted into an interface of the extended dock, so that electrical signal transmission is performed between the electronic device 100 and the extended dock.

In addition, when the electronic device 100 is not arranged with the functional main body 25, the interface 254 may also be arranged on the end face of the second body 20 away from the first body 10. In this way, when the electronic device 100 is inserted into an extended dock, electrical signal transmission may be performed between the electronic device 100 and the extended dock through the interface.

Specifically, the rotating shaft 22 used in the above three structures of the second body 20 may be a commonly-used damping rotating shaft in the related art or the following rotating shaft.

Figure 11:
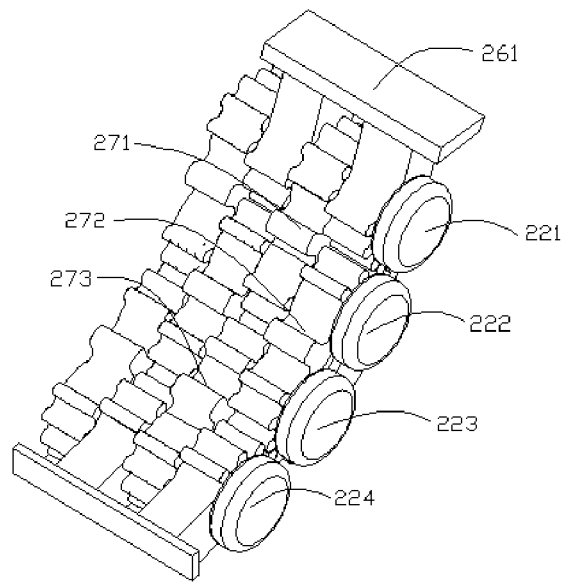
FIG. 11 is a structural schematic diagram of a rotating shaft in an electronic device of the present application.
Figure 12:
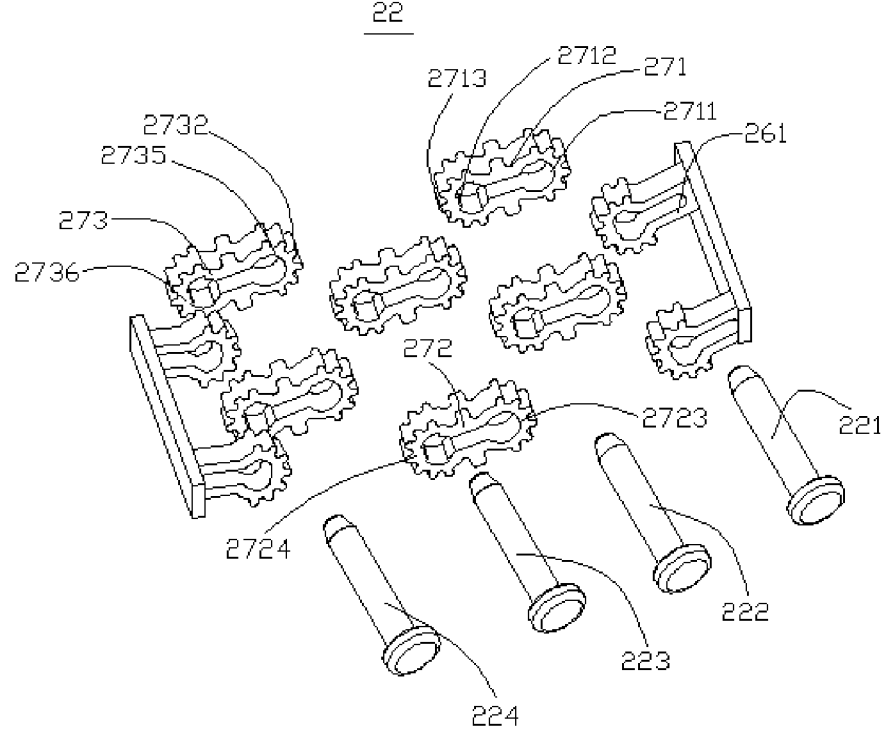
FIG. 12 is an exploded view of the rotating shaft in FIG. 11.

With reference to FIGS. 11 and 12, the rotating shaft 22 includes a first central shaft 221, a second central shaft 222, a third central shaft 223 and a fourth central shaft 224 as well as a first fixed part 261, a first connecting part 271, a second connecting part 272 and a third connecting part 273.

A first end of the first fixed part 261 is fixed to the first body 10, and a second end opposite to the first end is sleeved on the first central shaft 221 and is rotatable with respect to the first central shaft 221.

A first connecting end of the first connecting part 271 is sleeved on the first central shaft 221, and a second connecting end 2712 opposite to the first connecting end 2711 is sleeved on the second central shaft 222. The first connecting part 271 is rotatable with respect to the first central shaft 221 and the second central shaft 222. Multiple juxtaposed first teeth 2713 are arranged on the second connecting end 2712 of the first connecting part 271.

A third connecting end 2723 of the second connecting part 272 is sleeved on the second central shaft 222, and a fourth connecting end 2724 opposite to the third connecting end 2723 is sleeved on the third central shaft 223. The second connecting part 272 is rotatable with respect to the second central shaft 222 and the third central shaft 223.

A fifth connecting end 2735 of the third connecting part 273 is sleeved on the third central shaft 223, and a sixth connecting end 2736 opposite to the fifth connecting end 2735 is sleeved on the fourth central shaft 224. The third connecting part 273 is rotatable with respect to the third central shaft 223 and the fourth central shaft 224. Multiple juxtaposed second teeth 2732 engaged with the multiple first teeth 2713 are arranged on the third connecting part 273.

When the electronic device 100 is to be opened by a user, firstly, a force is applied to the first body 10, the fixed body 261 connected to the first body 10 moves with the first body 10 and rotates with respect to the first central shaft 221, and brings the first central shaft 221 to move with respect to the second central shaft 222, and then brings the second central shaft 222 to move with respect to the third central shaft 223 through the first connecting part 271, and at the same time, the first connecting part 271 rotates with respect to the second central shaft 222, brings the third connecting part 273 to rotate with respect to the third central shaft 223 through the engagement between the first teeth 2713 and the second teeth 2732, and brings the third central shaft 223 to move with respect to the fourth central shaft 224. In this way, the rotating shaft 22 rotates with respect to the first body 10. The frictions between the multiple central shafts and the multiple connecting parts of the rotating shaft 22 enable the position of the first body 10 with respect to the deformed second body 20 to maintain unchanged.

Further, in order to enable the electronic device 100 to maintain in a stable usage state, when the electronic device 100 is in a supporting state, the second body 20 is used to support the first body 10 on a supporting body such as a desktop etc. A moment generated by a gravity of the second body 20 and a friction generated between the first body 10 and the second body 20 is greater than a moment generated by a gravity of the first body 10, thereby preventing the electronic device 100 from falling over, for convenience of use by a user; or When the second body 20 is inserted into the fixed body 200 such as an extended dock etc., a moment generated by the gravity of the second body 20, a gravity of the fixed body 10 and the friction between the first body 10 and the second body 20 is greater than the moment generated by the gravity of the first body 10, thereby preventing the electronic device 100 from falling over, for convenience of use by a user.

The second body 20 of the electronic device 100 is configured to be deformable. Thereby, when the electronic device 100 is in use, the second body may be deformed into different shapes. The deformed second body 20 may be fixed by applying a force to the second body 20 or setting other fixed members. In this way, the electronic device 100 may be in different usage states. This solves the technical problem in the related art that the usage forms of the existing electronic devices are unitary, which can not meet users' diversified usage requirements, and achieve the purpose of meeting users' diversified usage requirements.

The second body 20 is arranged to maintain in a deformed state, so that when the electronic device is in use by a user, occurrence of conditions such as elastic recovery of the second body 20 due to improper use is avoided, for convenience of use by the user.

The electronic device 100 is arranged to maintain in a state of the unchanged position of the first body 10 with respect to the deformed second body 20, so that when the electronic device 100 is in use by a user, the position of the second body 20 with respect to the first body 10 maintains unchanged. This solves the technical problem in the related art that a protective cover of an electronic device, such as, an IPAD, etc. may rotate freely with respect to a body, thereby improving users' usage satisfaction.

The electronic device 100 is arranged to maintain in a state of any position of the first body 10 with respect to the second body 20. In this way, a user may use the electronic device 100 in any of the multiple stable states of the electronic device 100, thereby improving user experience.

A magnetic member 21 is arranged on an end face of the second body 20 away from the second body 10. When the second body 20 is inserted into the fixed groove 210, the magnetic member 21 is attracted to a magnetic member arranged in the fixed groove 210 corresponding to the magnetic member 21. In this way, the electronic device 100 is accurately fixed to the fixed body 200, thereby preventing the second body 20 from being separated from the fixed body 200 under an improper force.

The second body 20 is folded up or rolled up with respect to the first body 10, so that a user can hold the electronic device 100 with one hand and operate the electronic device 100 with the other hand, for convenience of use by the user when in a walk or in a car etc. The second body 20 is folded up or rolled up to be held by a user, thereby reducing possibility that the electronic device 100 drops when is in use.

The elastic housing coated on the rotating shaft 22 is arranged on the second body 20. When the position of the first body 10 with respect to the second body 20 changes, the elastic housing 23 elastically deforms. The position relationship of the end face of the second body 20 away from the first body 10 with respect to other surfaces connected to the end face maintains unchanged, thereby improving quality of appearance of the electronic device 100.

The extended portion 24 connected to an end on the rotating shaft 22 away from the first body 10 is arranged on the second body 20. The extended portion 24 may be fixed in the fixed groove 210 of the fixed body 200 such as a base, an extended dock etc. When the extended portion 24 is fixed in the fixed groove 210, an additional weight is added to the fixed body 200, so that a moment generated by the gravities of the fixed body 200 and the extended portion 24 is greater than a moment generated by a gravity of the first body 10 and a force applied on the first body 10. In this way, when the electronic device 100 is to be opened, the force needs to be applied on the first body only with one hand without operating the second body 20 or the fixed body 200 with the other hand. This can ensure that the electronic device 100 will not fall over or roll over, When the second body 20 is a host, an interface 254 connected to the electronic element 253 is arranged on an end face of the second body 20 away from the first body 10. When the electronic device 100 is inserted into an extended dock, the interface 254 may be inserted into an interface of the extended dock, so that electrical signal transmission is performed between the electronic device 100 and the extended dock.

Other embodiments of the present application provide a connecting part and an electronic device, to solve the technical problem in the related art that it needs to hold an electronic device in hand when the electronic device is in use, limiting the activity of the user's hands.

In order to solve the above technical problem, a general concept is proposed as follows in the other embodiments of the present application.

A connecting part includes: a lateral, a bottom and a top, wherein the bottom is connected to a first end face of the lateral; and the top is connected to a second end face on the lateral opposite to the first end face, the top being arranged opposite to the bottom so that an accommodating space is formed by the bottom, the lateral and the top; wherein the accommodating space is used to accommodate N electronic accessories, where N is greater than or equal to 1 and each of the N electronic accessories includes a body, an accommodated portion, and a flexible portion connecting the body and the accommodated portion; when accommodated portions of the N electronic accessories are placed in the accommodating space, flexible portions of at least one of the N electronic accessories deform under an external force, so that bodies of the at least one electronic accessory can rotate with respect to an end face on the bottom or top away from the lateral, to change positions of the bodies with respect to the accommodated portion.

An electronic device includes: a connecting part and N electronic accessories, wherein the connecting part includes a lateral, a bottom connected to a first end face of the lateral, and a top connected to a second end face on the lateral opposite to the first end face, the top being arranged opposite to the bottom so that an accommodating space is formed by the bottom, the lateral and the top; each of the N electronic accessories includes a body, an accommodated portion, and a flexible portion connecting the body and the accommodated portion, where N is greater than or equal to 1; when accommodated portions of the N electronic accessories are placed in the accommodating space, flexible portions of at least one of the N electronic accessories deform under an external force, so that bodies of the at least one electronic accessory can rotate with respect to an end face on the bottom or top away from the lateral, to change positions of the bodies with respect to the accommodated portion.

An accommodating space is formed by the bottom, the lateral and the top to accommodate the accommodated portions of the N electronic accessories, and the flexible portions of the at least one of the N electronic accessories deform under an external force, to enable the bodies of the at least one accessory to rotate with respect to an end face on the bottom or the top away from the lateral, so as to change positions of the bodies with respect to the accommodated portion. Thereby, the accessories can be adjusted to be at different usage angles for the user. This solves the technical problem in the related art that it needs to hold the electronic accessories in hand when the electronic device is in use, limiting the activity of the user's hands, and achieves the purpose of releasing a user's hands.

For better understanding the above technical solutions, the technical solutions will be described in detail below in injunction with accompanying drawings of the specification and specific embodiments.

Figure 13:
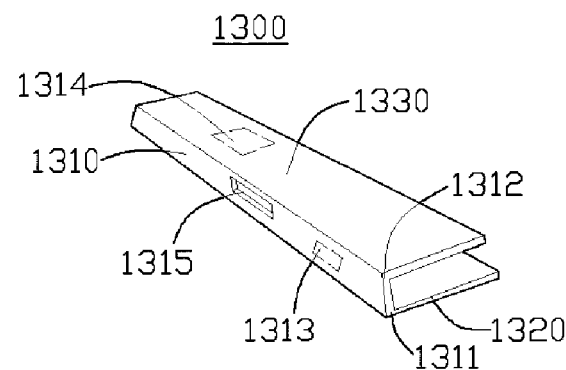
FIG. 13 is a perspective schematic view of a connecting part according to an embodiment of the present application.

As shown in FIG. 13, illustrated is a perspective schematic view of a connecting part 1300 according to an embodiment of the present disclosure. The connecting part 1300 includes a lateral 1310, a bottom 1320, and a top 1330. The connecting part 1300 may be integrally formed, or may also be formed by fixing the lateral 1310, the bottom 1320 and the top 1330 together. In addition, the connecting part 1300 may be made of a metal material or a plastic material.

The bottom 1320 is connected to a first end face 1311 of the lateral 1310, i.e., the structure is formed by the bottom 1320 extending from the first end face 1311 of the lateral 1310 in a first direction.

The top 1330 is connected to a second end face 1312 on the lateral 1310 opposite to the first end face 1311, i.e., the structure is formed by the top 1330 extending from the second end face 1312 in a second direction. The second direction is approximately parallel to the first direction. The top 1330 is arranged opposite to the bottom 1320, so that an accommodating space is formed by the bottom 1320, the lateral 1310 and the top 1330. A section enclosed by the bottom 1320, the lateral 1310 and the top 1330 is in a U shape.

Figure 14:
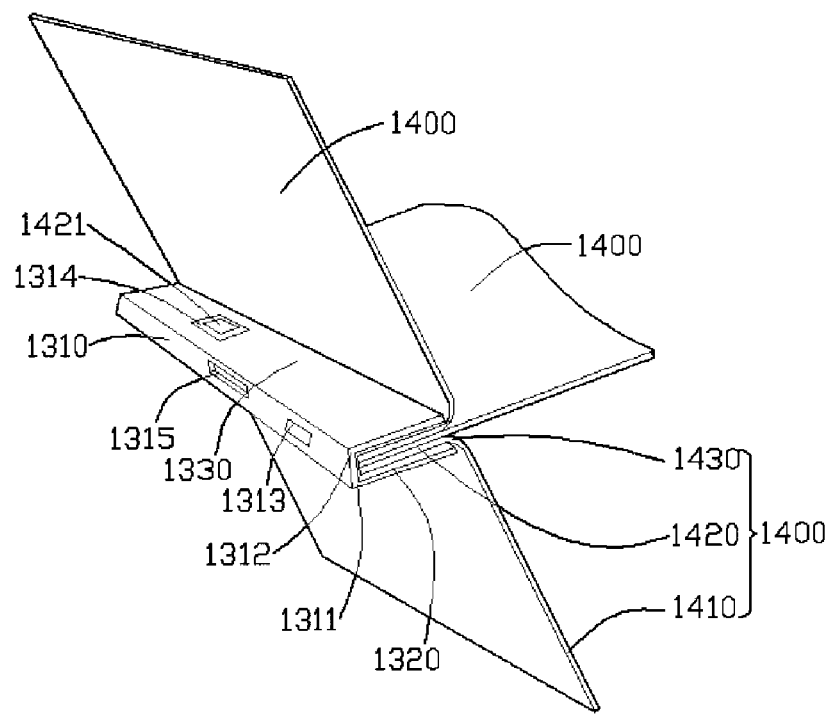
FIG. 14 is a reference diagram of a usage state of the connecting part illustrated in FIG. 13.
Figure 15:
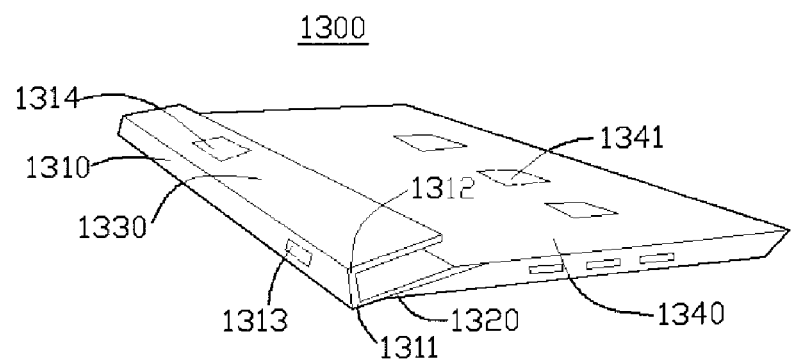
FIG. 15 is a perspective schematic view of a connecting part according to an embodiment of the present application.

Also with reference to FIG. 14, the accommodating space is used to accommodate N electronic accessories 1400, where N is greater than or equal to 1. Each of the N electronic accessories 1400 includes a body 1410, an accommodated portion 1420 and a flexible portion 1430 connected to the body 1410 and the accommodated portion 1420. Specifically, when N is greater than or equal to 2, the N electronic accessories 1400 are separable and independent of each other. Therefore, positions of at least one of the N electronic accessories 1400 may change with respect to other electronic accessories.

When the accommodated portions 1420 of the N electronic accessories 1400 are placed in the accommodating space, flexible portions 1430 of at least one of the N electronic accessories 1400 deform under an external force, so that bodies 1410 of the at least one electronic accessory can rotate with respect to an end face on the bottom 1320 or top 1330 away from the lateral 1310, to change positions of the bodies 1410 with respect to the accommodated portion 1420.

An accommodating space is formed by the bottom 1320, the lateral 1310 and the top 1330 to accommodate the accommodated portions 1420 of the N electronic accessories 1400, and the flexible portions 1430 of at least one of the N electronic accessories 1400 deform under an external force, so that the bodies 1410 of the at least one accessory can rotate with respect to an end face on the bottom 1320 or the top 1330 away from the lateral 1310, to change positions of the bodies 1410 with respect to the accommodated portion 1420. Thereby, the accessories can be adjusted to be at different usage angles for the user. This solves the technical problem in the related art that it needs to hold the electronic accessories in hand when the electronic device is in use, limiting the activity of the user's hands, and achieves the purpose of releasing a user's hands.

In addition, a magnetic member 1314 is arranged on the bottom 1320, the lateral 1310 and/or the top 1330. When the N electronic accessories 1400 are placed in the accommodating space 1400, magnetic members 1421 on at least one of the N electronic accessories 1400 can be attracted to the magnetic member 1314. A number of the magnetic members 1314 may be set as needed. There may be multiple magnetic members instead of only one magnetic member. The magnetic member 1314 is arranged on the bottom 1320, the lateral 1310 and/or the top 1330, so that when the electronic accessories 1400 are fixed in the accommodating space, the corresponding magnetic members 1421 on the electronic accessories 1400 can be attracted to the magnetic member 1314, thereby preventing the electronic accessories 1400 from being separated from the connecting part 1300 during use and protecting the electronic accessories 1400.

In addition, when there are multiple electronic accessories 1400, i.e., N is greater than or equal to 2, and the N electronic accessories 1400 are accommodated in the accommodating space, data transmission can be implemented among the N electronic accessories 1400. The data transmission may be implemented in a wireless manner such as through WIFI or in a wired manner such as through a USB connection.

Further, through-holes 1315 are opened up on the lateral 1310. When the at least one electronic accessory 1400 is placed in the accommodating space, interfaces such as USB interfaces, audio/video interfaces of the at least one electronic accessory 1400 can be exposed through the through-holes 1315. Therefore, when the electronic accessories 1400 are accommodated in the accommodating space of the connecting part 1300, the interfaces of the electronic accessories 1400 may be connected to the outside. The through-holes 1315 are opened up on the lateral 1310 so that the interfaces of the electronic accessories 1400 accommodated in the accommodating space can be exposed, to facilitate data communication with the outside or charge etc.

The connecting part 1300 may be a part only with a connection function. Further, the connecting part 1300 may also be a body with other functions, as shown in FIGS. 8 and 9. When the connecting part 1300 is a body with other functions, the connecting part 1300 further includes a functional main body 1340 connected to an end face on the bottom 1320 away from the lateral 1310. An electric connector 1313 is arranged on the lateral 1310, the bottom 1320 and/or the top 1330. An electronic device 1341 in the functional main body 1340 is electrically connected to the electric connector 1313.

When the at least one electronic accessory 1400 is accommodated in the accommodating space, deformable parts of the at least one electronic accessory 1400 deform under an external force, so that the body 1410 can rotate with respect to an end face on the top 1330 away from the lateral 1310, and the at least one electronic accessory 1400 can be electrically connected to the electric connector 1313, so that the functional main body 1340 can transmit data to the at least one electronic accessory 1400. For example, the functional main body 1340 may input information to the electronic accessory 1400, or charge the electronic accessory 1400 and the like.

An accommodating space is formed by the bottom 1320, the lateral 1310 and the top 1330 to accommodate the accommodated portions 1420 of the N electronic accessories 1400, and the flexible portions 1430 of at least one of the N electronic accessories 1400 deform under an external force, so that the bodies 1410 of the at least one accessory can rotate with respect to an end face on the bottom 1320 or the top 1330 away from the lateral 1310, to change positions of the bodies 1410 with respect to the accommodated portion 1420. Thereby, the accessories can be adjusted to be at different usage angles for the user. This solves the technical problem in the related art that it needs to hold the electronic accessories in hand when the electronic device is in use, limiting the activity of the user's hands, and achieves the purpose of releasing a user's hands.

A magnetic member 1314 is arranged on the bottom 1320, the lateral 1310 and/or the top 1330, so that when the electronic accessories 1400 are fixed in the accommodating space 1400, the corresponding magnetic members on the electronic accessories 1400 can be attracted to the magnetic member 1314, thereby preventing the electronic accessories 1400 from being separated from the connecting part 1300 during use and protecting the electronic accessories 1400.

The through-holes 1315 are opened up on the lateral 1310 so that the interfaces of the electronic accessories 1400 accommodated in the accommodating space can be exposed, to facilitate data communication with the outside or charge etc.

On basis of the same inventive concept, the present application further provides an electronic device. As shown in FIG. 14, illustrated is a structural schematic diagram of the electronic device. The electronic device includes a connecting part 1300 and N electronic accessories 1400.

The connecting part 1300 includes a lateral 1310, a bottom 1320 connected to a first end face 1311 of the lateral 1310, and a top 1330 connected to a second end face 1312 on the lateral 1310 opposite to the first end face 1311. The top 1330 is arranged opposite to the bottom 1320, so that an accommodating space is formed by the bottom 1320, the lateral 1310 and the top 1330.

Each of the N electronic accessories 1400 includes a body 1410, an accommodated portion 1420, and a flexible portion 1430 connected to the body 1410 and the accommodated portion 1420, where N is greater than or equal to 1. Specifically, when N is greater than or equal to 2, the N electronic accessories are separable and independent of each other. Therefore, positions of at least one of the N electronic accessories 1400 change with respect to other electronic accessories.

When the accommodated portions 1420 of the N electronic accessories 1400 are placed in the accommodating space, flexible portions 1430 of at least one of the N electronic accessories 1400 deform under an external force, so that bodies 1410 of the at least one electronic accessory 1400 can rotate with respect to an end face on the bottom 1320 or top 1330 away from the lateral 1310, to change positions of the bodies 1410 with respect to the accommodated portion 1420.

An accommodating space is formed by the bottom 1320, the lateral 1310 and the top 1330 to accommodate accommodated portions 1420 of the N electronic accessories 1400, and the flexible portions 1430 of at least one of the N electronic accessories 1400 deform under an external force, so that the bodies 1410 of the at least one accessory can rotate with respect to an end face on the bottom 1320 or the top 1330 away from the lateral 1310, to change positions of the bodies 1410 with respect to the accommodated portion 1420. Thereby the accessories can be adjusted to be at different usage angles for the user. This solves the technical problem in the related art that it needs to hold the electronic accessories in hand when the electronic device is in use, limiting the activity of the user's hands, and achieves the purpose of releasing a user's hands.

Further, a magnetic member 1314 is arranged on the bottom 1320, the lateral 1310 and/or the top 1330. When the N electronic accessories 1400 are placed in the accommodating space, the magnetic members 1421 on at least one of the N electronic accessories 1400 can be attracted to the magnetic member 1314. A number of the magnetic members 1314 may be set as needed. There may be multiple magnetic members instead of only one magnetic member. The magnetic member 1314 is arranged on the bottom 1320, the lateral 1310 and/or the top 1330, so that when the electronic accessories 1400 are fixed in the accommodating space, the corresponding magnetic members on the electronic accessories 1400 can be attracted to the magnetic member 1314, thereby preventing the electronic accessories 1400 from being separated from the connecting part 1300 during use and protecting the electronic accessories 1400.

Further, when there are multiple electronic accessories 1400, i.e., N is greater than or equal to 2, and the N electronic accessories 1400 are accommodated in the accommodating space, data transmission can be implemented among the N electronic accessories 1400. The data transmission may be implemented in a wireless manner such as through WIFI or in a wired manner such as through a USB connection.

Further, through-holes 1315 are opened up on the lateral 1310. When the at least one electronic accessory 1400 is placed in the accommodating space, interfaces such as USB interfaces, audio/video interfaces of the at least one electronic accessory 1400 can be exposed through the through-holes 1315. Therefore, when the electronic accessories 1400 are accommodated in the accommodating space of the connecting part 1300, the interfaces of the electronic accessories 1400 may be connected to the outside. The through-holes 1315 are opened up on the lateral 1310 so that the interfaces of the electronic accessories 1400 accommodated in the accommodating space can be exposed, to facilitate data communication with the outside or charge etc.

Figure 16:
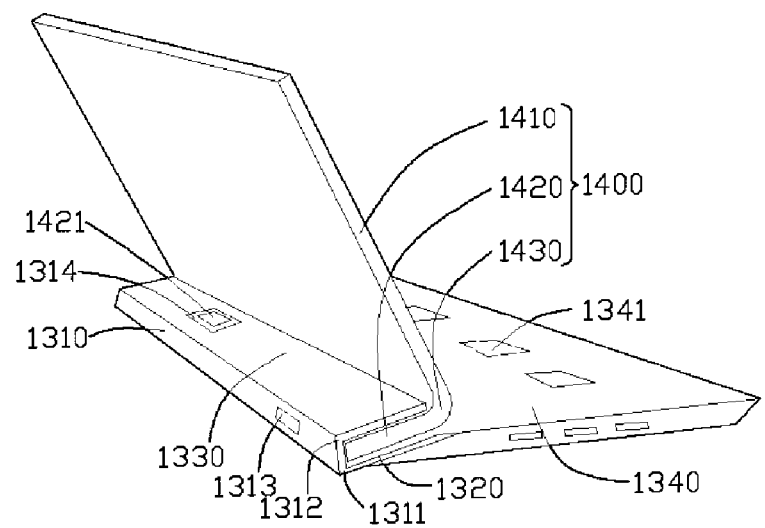
FIG. 16 is a reference diagram of a usage state of the connecting part in FIG. 15.

Further, in addition to being a part only with a connection function, the connecting part 1300 may also be a body with other functions. As shown in FIG. 16, illustrated is a structural schematic diagram of another electronic device. When the connecting part 1300 is a body with other functions, the connecting part 1300 further includes a functional main body 1340 connected to an end face on the bottom 1320 away from the lateral 1310. An electric connector 1313 is arranged on the lateral 1310, the bottom 1320 and/or the top 1330. An electronic device 1341 in the functional main body 1340 is electrically connected to the electric connector 1313.

When the at least one electronic accessory 1400 is accommodated in the accommodating space, deformable parts of the at least one electronic accessory 1400 deform under an external force, so that the bodies 1410 can rotate with respect to an end face on the top 1330 away from the lateral 1310, and the at least one electronic accessory 1400 can be electrically connected to the electric connector 1313, so that the functional main body 1340 can transmit data to the at least one electronic accessory 1400. For example, the functional main body 1340 may input information to the electronic accessory 1400, or charge the electronic accessory 1400 and the like.

An accommodating space is formed by the bottom 1320, the lateral 1310 and the top 1330 to accommodate accommodated portions 1420 of the N electronic accessories 1400, and flexible portions 1430 of at least one of the N electronic accessories 1400 deform under an external force, so that the bodies 1410 of the at least one accessory can rotate with respect to an end face on the bottom 1320 or the top 1330 away from the lateral 1310, so as to change positions of the bodies 1410 with respect to the accommodated portion 1420. Thereby the accessories can be adjusted to be at different usage angles for the user. This solves the technical problem in the related art that it needs to hold the electronic accessories in hand when the electronic device is in use, limiting the activity of the user's hands, and achieves the purpose of releasing a user's hands.

A magnetic member 1314 is arranged on the bottom 1320, the lateral 1310 and/or the top 1330, so that when the electronic accessories 1400 are fixed in the accommodating space, the corresponding magnetic members on the electronic accessories 1400 can be attracted to the magnetic member 1314, thereby preventing the electronic accessories 1400 from being separated from the connecting part 1300 during use and protecting the electronic accessories 1400.

Through-holes 1315 are opened up on the lateral 1310 so that the interfaces of the electronic accessories 1400 accommodated in the accommodating space can be exposed, to facilitate data communication with the outside or charge etc.

In addition, in some embodiments of the present application, the electronic accessories 1400 and the connecting part 1300 may be integrally formed, or the electronic accessories 1400 and the functional main body 1340 may be integrally formed, or all of the electronic accessories 1400, the connecting part 1300 and the functional main body 1340 are integrally formed. Other aspects are similar to those illustrated in FIG. 16. That is, the accommodated portions 1420 of the electronic accessories 1400, the functional main body 1340 and one or more of the top 1330, the lateral 1310 and the bottom 1320 of the connecting part 1300 may be integrally formed.

In addition, in some embodiments of the present application, in the case illustrated in FIG. 16, when an external force is applied to the electronic accessory 1400, for example, when a user pushes the body 1410 of the electronic accessory 1400 which may be used as a display screen in an anti-clockwise direction in FIG. 16 with one hand, due to the existence of the top 1330 of the connecting part 1300 (which protrudes from the main body 1340 of the electronic device), the flexible portion 1430 of the electronic accessory 1400 deforms at a position corresponding to an outer edge of the top 1330 away from the lateral 1310, so that the body 1410 can rotate with respect to the main body 1340 with the outer edge of the top 1330 as an axis, to form a usage state after the flexible portion 1430 deforms as illustrated in FIG. 16. In this way, the user can cause the body 1410 to rotate with respect to the main body 1340 with a single-hand operation, without the aid of the other hand of the user, since the outer edge of the top 1330 away from the lateral 1310 plays a role of the other hand.

Some embodiments the present disclosure provide the following beneficial effects:

The second body of the electronic device is configured to be deformable. Thereby, when the electronic device is in use, the second body may be deformed into different shapes, to bring the electronic device to be in different usage states. This solves the technical problem in the related art that the usage forms of the existing electronic devices are unitary, which can not meet users' diversified usage requirements, and achieve the purpose of meeting users' diversified usage requirements.

The second body 20 is arranged to maintain in a deformed state, so that when the electronic device is in use by a user, occurrence of conditions such as elastic recovery of the second body 20 due to improper use is avoided, for convenience of use by the user.

The electronic device 100 is arranged to maintain in a state of the unchanged position of the first body 10 with respect to the deformed second body 20, so that when the electronic device 100 is in use by a user, the position of the second body with respect to the first body 10 maintains unchanged. This solves the technical problem in the related art that a protective cover of an electronic device, such as, an IPAD, etc., may rotate freely with respect to a body, thereby improving users' usage satisfaction.

The electronic device is arranged to maintain in a state of any position of the first body with respect to the second body. In this way, a user may use the electronic device in any of the multiple stable states of the electronic device, thereby improving user experience.

A magnetic member is arranged on an end face of the second body away from the second body. When the second body is inserted into the fixed groove, the magnetic member is attracted to a magnetic member arranged in the fixed groove corresponding to the magnetic member. In this way, the electronic device is accurately fixed to the fixed body, thereby preventing the second body from being separated from the fixed body under an improper force.

The second body is folded up or rolled up with respect to the first body, so that a user can hold the electronic device with one hand and operate the electronic device with the other hand, for convenience of use by the user when in a walk or in a car etc. The second body is folded up or rolled up to be held by a user, thereby reducing possibility that the electronic device slides down when is in use.

The elastic housing coated on the rotating shaft is arranged on the second body. When the position of the first body with respect to the second body changes, the elastic housing elastically deforms. The position relationship of the end face of the second body away from the first body with respect to other surfaces connected to the end face maintains unchanged, thereby improving quality of appearance of the electronic device.

The extended portion connected to an end on the rotating shaft away from the first body is arranged on the second body. The extended portion may be fixed in the fixed groove of the fixed body such as a base, an extended dock etc. When the extended portion is fixed in the fixed groove, an additional weight is added to the fixed body, so that a moment generated by the gravities of the fixed body and the extended portion is greater than a moment generated by a gravity of the first body and a force applied on the first body. In this way, when the electronic device is to be opened, the force needs to be applied on the first body only with one hand without operating the second body or the fixed body with the other hand. This can ensure that the electronic device will not fall over or roll over, When the second body is a host, an interface connected to the electronic element is arranged on an end face of the second body away from the first body. When the electronic device is inserted into an extended dock, the interface may be inserted into an interface of the extended dock, so that electrical signal transmission is performed between the electronic device and the extended dock.

Some other embodiments of the present disclosure provide the following beneficial effects:

an accommodating space is formed by the bottom, the lateral and the top to accommodate accommodated portions of the N electronic accessories, and flexible portions of at least one of the N electronic accessories deform under an external force, so that the bodies of the at least one accessory can rotate with respect to an end face on the bottom or the top away from the lateral, to change positions of the bodies with respect to the accommodated portion. Thereby the accessories can be adjusted to be at different usage angles for the user. This solves the technical problem in the related art that it needs to hold the electronic accessories in hand when the electronic device is in use, limiting the activity of the user's hands, and achieves the purpose of releasing a user's hands.

A magnetic member is arranged on the bottom, the lateral and/or the top, so that when the electronic accessories are fixed in the accommodating space, the corresponding magnetic members on the electronic accessories can be attracted to the magnetic member, thereby preventing the electronic accessories from being separated from the connecting part during use and protecting the electronic accessories.

Through-holes are opened up on the lateral so that the interfaces of the electronic accessories accommodated in the accommodating space can be exposed, to facilitate data communication with the outside or charge etc.

Although embodiments of the present application have been described, additional changes and modifications can be made to these embodiments by those skilled in the art upon learning the basic creative concepts. Therefore, the appended claims are intended to be construed as comprising the embodiments and all changes and modifications that fall into the scope of the present application.

Obviously, those skilled in the art can make various modifications and variations to the present application without departing from the spirit and scope of the present application. Thus, if these modifications and variations of the present application belong to the scope of the claims of the present application and the equivalent technologies thereof, the present application is also intended to include these modifications and variations.

What is claimed is:

1. An electronic accessory, comprising:
an integrated body having a flat structure in a normal state and having a bent structure in a deformed state, the integrated body further comprising:
a first part having at least a display screen;
a second part being deformable; and
a third part connected to the first part via the second part, wherein the second part comprises a rotating shaft rotationally connected to the first part, and different states of the position of the first part with respect to the third part are maintained by the rotating shaft,
wherein the rotating shaft comprises:
a first central shaft, a second central shaft, a third central shaft, and a fourth central shaft;
a first fixed part, wherein a first end of the first fixed part is fixed to the first part, and a second end opposite to the first end is sleeved on the first central shaft and is rotatable with respect to the first central shaft;
a first connecting part, wherein a first connecting end of the first connecting part is sleeved on the first central shaft, a second connecting end opposite to the first connecting end is sleeved on the second central shaft, the first connecting part is rotatable with respect to the first central shaft and the second central shaft, and multiple juxtaposed first teeth are arranged on the second connecting end of the first connecting part;
a second connecting part, wherein a third connecting end of the second connecting part is sleeved on the second central shaft, a fourth connecting end opposite to the third connecting end is sleeved on the third central shaft, and the second connecting part is rotatable with respect to the second central shaft and the third central shaft; and
a third connecting part, wherein a fifth connecting end of the third connecting part is sleeved on the third central shaft, a sixth connecting end opposite to the fifth connecting end is sleeved on the fourth central shaft, the third connecting part is rotatable with respect to the third central shaft and the fourth central shaft, and multiple juxtaposed second teeth engaged with the multiple first teeth are arranged on the third connecting part.

2. The electronic accessory according to claim 1, wherein after the second part is deformed, the electronic accessory is maintained in the deformed state.

3. The electronic accessory according to claim 1, wherein in the case that the electronic accessory is maintained in the deformed state, a position of the first part with respect to the third part is maintained.

4. The electronic accessory according to claim 3, wherein in the case that the electronic accessory is maintained in a state, any position of the first part with respect to the third part is maintained.

5. The electronic accessory according to claim 4, wherein in the case that the first part is located at a first position and is stationary with respect to the third part, the first position of the first part with respect to the third part is maintained to be unchanged, and the electronic accessory is in a first usage posture; and/or
in the case that the first part is located at a second position and is stationary with respect to the third part, the second position of the first part with respect to the third part is maintained to be unchanged, and the electronic accessory is in a second usage posture different from the first usage posture; and/or
in the case that the first part is located at a third position and is stationary with respect to the third part, the third position of the first part with respect to the third part is maintained to be unchanged, and the electronic accessory is in a third usage posture, wherein the first usage posture, the second usage posture, and the third usage posture are different from each other.

6. The electronic accessory according to claim 1, wherein the second part further comprises an elastic housing made of an elastic material, wherein the rotating shaft is coated with the elastic housing and the elastic housing is fixedly connected to the first part, and in the case that the position of the first part with respect to the third part changes, the elastic housing elastically deforms.

7. The electronic accessory according to claim 1, wherein a size of the third part in a direction in which the first part, the rotating shaft and the third part are connected is less than a size of the rotating shaft in the direction.

8. The electronic accessory according to claim 1, wherein the third part further comprises a functional main body connected to an end on the rotating shaft away from the first part, and the functional main body comprises a housing and an electronic element arranged in the housing.

9. The electronic accessory according to claim 1, wherein in the case that the third part is partially fixed to a fixed part, a relative position relationship between the first part and the third part is changeable with a single hand.

10. The electronic accessory according to claim 1, wherein an interface is arranged on an end face of the third part away from the first part, and the electronic accessory performs electrical signal transmission through the interface.

11. The electronic accessory according to claim 1, wherein a magnetic member is arranged on an end face of the third part away from the first part, to accurately fix the electronic accessory to a fixed part.

12. The electronic accessory according to claim 1, wherein the second part and the third part are rolled into a roll to bring the electronic accessory to be in a holding usage state.

13. The electronic accessory according to claim 1, wherein the electronic accessory has multiple usage postures, and after a usage posture of the electronic accessory changes, at least display content corresponding to a current usage posture of the electronic accessory is displayed on the display screen.

14. The electronic accessory according to claim 1, wherein in the case that the electronic accessory is in a supporting state, the third part is used for supporting the first part on a supporting part, and a moment, which is generated by a gravity of the third part and a friction between the first part and the third part, is greater than a moment generated by a gravity of the first part; or
in the case that the third part is inserted in a fixed part, a moment, which is generated by the gravity of the third part, a gravity of the fixed part, and the friction between the first part and the third part, is greater than the moment generated by the gravity of the first part.

15. An electronic device, comprising:
an electronic accessory comprising an integrated body having a flat structure in a normal state and having a bent structure in a deformation state; and a holding element configured to hold the electronic accessory, the holding element comprising an accommodating groove configured to receive at least a part of the accessory to hold the accessory, wherein the integrated body comprises:

a first part having at least a display screen;

a second part being deformable; and a third part connected to the first part via the second part, and the third part is received in the accommodating groove, and wherein the second part comprises a rotating shaft rotationally connected to the first part, and different states of the position of the first part with respect to the third part are maintained by the rotating shaft.

16. The electronic device according to claim 15, wherein in the case that the integrated body is in the deformation state, the first part is bent from the holding element via the second part.

17. An electronic device, comprising:

a main body;

an electronic accessory comprising an integrated body having a flat structure in a normal state and having a bent structure in a deformation state; and a holding element arranged on a first side of the main body, the holding element comprising an accommodating groove configured to receive at least a part of the electronic accessory to hold the electronic accessory on the main body, wherein the integrated body comprises:

a first part having at least a display screen;

a second part being deformable; and a third part connected to the first part via the second part, and the third part is received in the accommodating groove, and wherein the second part comprises a rotating shaft rotationally connected to the first part, and different states of the position of the first part with respect to the third part are maintained by the rotating shaft.

* * * * *